(12) United States Patent
Sohn et al.

(10) Patent No.: US 9,369,895 B2
(45) Date of Patent: Jun. 14, 2016

(54) METHOD AND DEVICE FOR CHANNEL MEASUREMENT IN A WIRELESS LAN SYSTEM

(75) Inventors: Ill Soo Sohn, Anysang-si (KR); Sunghyun Choi, Anyang-si (KR); Seung Min Yoo, Anyang-si (KR); Hyewon Lee, Anyang-si (KR); Mun Hwan Choi, Anyang-si (KR); Yong Ho Seok, Anyang-si (KR); Ok Hwan Lee, Anyang-si (KR)

(73) Assignees: SNU R&DB FOUNDATION, Seoul (KR); LG ELECTRONICS INC., Seoul (KR)

( * ) Notice: Subject to any disclaimer, the term of this patent is extended or adjusted under 35 U.S.C. 154(b) by 165 days.

(21) Appl. No.: 14/124,584

(22) PCT Filed: Jun. 1, 2012

(86) PCT No.: PCT/KR2012/004335
§ 371 (c)(1),
(2), (4) Date: Dec. 6, 2013

(87) PCT Pub. No.: WO2012/169745
PCT Pub. Date: Dec. 13, 2012

(65) Prior Publication Data
US 2014/0098701 A1 Apr. 10, 2014

Related U.S. Application Data

(60) Provisional application No. 61/494,394, filed on Jun. 7, 2011.

(51) Int. Cl.
*H04B 7/04* (2006.01)
*H04B 7/06* (2006.01)
*H04W 24/08* (2009.01)

(52) U.S. Cl.
CPC ............ *H04W 24/08* (2013.01); *H04B 7/0452* (2013.01); *H04B 7/065* (2013.01); *H04B 7/0617* (2013.01); *H04B 7/0634* (2013.01)

(58) Field of Classification Search
CPC ............... H04L 1/0618; H04L 2025/03426; H04L 25/0242; H04B 17/336; H04B 17/345; H04B 7/0456; H04B 7/0626; H04B 7/0632; H04W 72/0426
See application file for complete search history.

(56) References Cited

U.S. PATENT DOCUMENTS 8,208,576 B2 * 6/2012 Ihm et al. .................. 375/267
8,594,688 B2 * 11/2013 Barbieri et al. ............ 455/450

(Continued)

OTHER PUBLICATIONS

Bandemer, et al., "Capacity-based Uplink Scheduling Using Long-Term Channel Knowledge", ICC 2007, IEEE, Jun. 2007, 6 pages.

*Primary Examiner* — Ayaz Sheikh
*Assistant Examiner* — Debebe Asefa
(74) *Attorney, Agent, or Firm* — Lee, Hong, Degerman, Kang & Walmey; Jonathan Kang; Michael Monaco

(57) ABSTRACT

The present invention relates to a method and device for channel measurement in a wireless LAN system. A station (STA) receives a plurality of sounding frames from an access point (AP), estimates the plurality of sounding frames in order to generate long-term channel state information (LCSI), provides the generated LCSI to the AP as feedback, and receives from the AP a group identifier (ID) management frame comprising information on a group ID determined on the basis of the LCSI.

5 Claims, 13 Drawing Sheets

(56) References Cited

U.S. PATENT DOCUMENTS 8,934,328 B2 * 1/2015 Shapira et al. ................ 370/204
2005/0037718 A1 2/2005 Kim et al.
2007/0223423 A1 9/2007 Kim et al.
2011/0026429 A1 2/2011 Ben Slimane et al.

* cited by examiner

| CATEGORY | ACTION | GROUP ID MANAGEMENT INFORMATION ELEMENT |
|---|---|---|

Octets: 1 1 VARIABLE (b)

| ELEMENT ID | LENGTH | SPATIAL STREAM POSITION FOR GROUP ID 1 | ... | SPATIAL STREAM POSITION FOR GROUP ID N |
|---|---|---|---|---|
| | | 3bits | | 3bits |

Bits:

METHOD AND DEVICE FOR CHANNEL MEASUREMENT IN A WIRELESS LAN SYSTEM

CROSS-REFERENCE TO RELATED APPLICATIONS

This application is the National Stage filing under 35 U.S.C. 371 of International Application No. PCT/KR2012/004335, filed on Jun. 1, 2012, which claims the benefit of U.S. Provisional Application Serial No. 61/494,394, filed on Jun. 7, 2011, the contents of which are all hereby incorporated by reference herein in their entirety.

BACKGROUND OF THE INVENTION

1. Field of the Invention

The present invention relates to a wireless LAN, and more particularly, to a method and apparatus for measuring a channel in a wireless LAN system.

2. Related Art

Recently, with the development of an information communication technology, various wireless communication technologies have been developed. Among the wireless communication technologies, a wireless local area network (WLAN) is a technology to wirelessly access to an Internet in a home, a company, or a specific service providing area by using portable terminals such as a personal digital assistant (PDA), a laptop computer, and a portable multimedia player (PMP) based on a wireless frequency technology.

In order to overcome a limit to a communication speed which has been pointed out as vulnerability in the WLAN, as a relatively recently established technical standard, there is the institute of electrical and electronics engineers (IEEE) 802.11n. The IEEE 802.11n is to increase a speed and reliability of a network and extend an operating distance of a wireless network. In more detail, the IEEE 802.11n supports a high throughout (HT) of which a data processing speed is maximally 540 Mbps or more. Further, in order to minimize a transmission error and optimize a data speed, the IEEE 802.11n is based on a multiple-input and multiple-output (MIMO) technology using a multi antenna for both a transmitting unit and a receiving unit.

As distribution of the WLAN has been activated and applications using the WLAN have been diversified, recently, the need for a new WLAN system for supporting a higher throughput than a data processing speed supported by the IEEE 802.11n A next-generation WLAN system supporting a very high throughput (VHT), as a next version of the IEEE 802.11n WLAN system, is one of the IEEE 802.11n WLAN systems which has been recently newly proposed in order to support a data processing speed of 1 Gbps or more in a media access control (MAC) service access point (SAP).

The next-generation WLAN system supports a multi user (MU)-MIMO transmission in which a plurality of non-AP stations (STA) simultaneously accesses a channel in order to effectively use a wireless channel. According to the MU-MIMO transmission mode, the AP may simultaneously transmit a frame to one or more STA which are MIMO paired.

In order to perform the MU-MIMO transmission, there is a need to accurately effectively measure a channel of each user.

SUMMARY OF THE INVENTION

The present invention provides a method and apparatus for measuring a channel in a WLAN system. The present invention provides a method for grouping a plurality of users by using long-term information of each user, when the plurality of users are grouped in order to perform MU-MIMO transmission.

In an aspect, a method for measuring, by a station (STA), a channel in a wireless LAN system is provided. The method includes receiving a plurality of sounding frames from an access point (AP), estimating the plurality of sounding frames to generate long-term channel state information (LSCI), feeding back the generated long-term channel state information to the AP, and receiving a group identifier (ID) management frame including information on a group ID determined based on the long-term channel state information from the AP.

The long-term channel state information may be calculated by Equation of $E_T[H_k^* H_k]$, where $E_T$ represents an average for a time T, $H_k$ represents a channel matrix of a k-th user, and $H_k^*$ represents a conjugate transpose matrix of $H_k$.

The plurality of sounding frames may include sounding frames transmitted to the station.

The plurality of sounding frames may include sounding frames transmitted to the station and overhear sounding frames transmitted to a second station different from the station.

The long-term channel state information may be transmitted through an LCSI report field within a very high throughput (VHT) action frame.

In another aspect, a method for managing, by an access point (AP), group identifier (ID) in a wireless LAN system is provided. The method includes transmitting a plurality of sounding frames to a plurality of stations (STA), receiving long-term channel state information (LSCI) generated in each station, calculating a bound of a time-averaged multi user (MU) multiple-input multiple-output (MIMO) sum capacity based on the received long-term channel state information, and transmitting a group ID management frame including information on a group ID determined based on the calculated bound of the time-averaged MU-MIMO sum capacity to the plurality of stations.

The long-term channel state information may be calculated by Equation of $E_T[H_k^* H_k]$, where $E_T$ represents an average for a time T, $H_k$ represents a channel matrix of a k-th user, and $H_k^*$ represents a conjugate transpose matrix of $H_k$.

The bound of the time-averaged MU-MIMO sum capacity may be calculated by the following Equation, $$\bar{C}_{MU-MIMO_{SUM}} \leq C_{MU-MIMO_{bound}} = \log_2 \det\left(I + \frac{SNR}{N_t} \sum_{k=1}^{K} E_T[H_k^* H_k]\right),$$

where I represents an interference matrix, SNR represents a signal to noise ratio, and K represents the number of users.

The long-term channel state information may be transmitted through an LCSI report field within a very high throughput (VHT) action frame.

In another aspect, a method for managing, by an access point (AP), group identifier (ID) in a wireless LAN system is provided. The method includes transmitting a beamforming (BF) feedback request to a plurality of stations (STA), receiving a BF feedback frame which is a response to the BF feedback request from the plurality of stations, generating long-term channel state information (LSCI) based on the received BF feedback frame, calculating a bound of a time-averaged multi user (MU) multiple-input multiple-output (MIMO) sum capacity based on the generated long-term channel state information, and transmitting a group ID management frame including information on a group ID determined based on the calculated bound of the time-averaged MU-MIMO sum capacity to the plurality of stations.

The BF feedback request and the BF feedback frame may be periodically transmitted and received.

It is possible to effectively group a plurality of users during MU-MIMO transmission.

BRIEF DESCRIPTION OF THE DRAWINGS

FIG. 4 shows an example of a structure of a group ID management frame.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.11 is chiefly described as an example in order to clarify the description, but the technical spirit of the present invention is not limited to IEEE 802.11.

Figure 1:
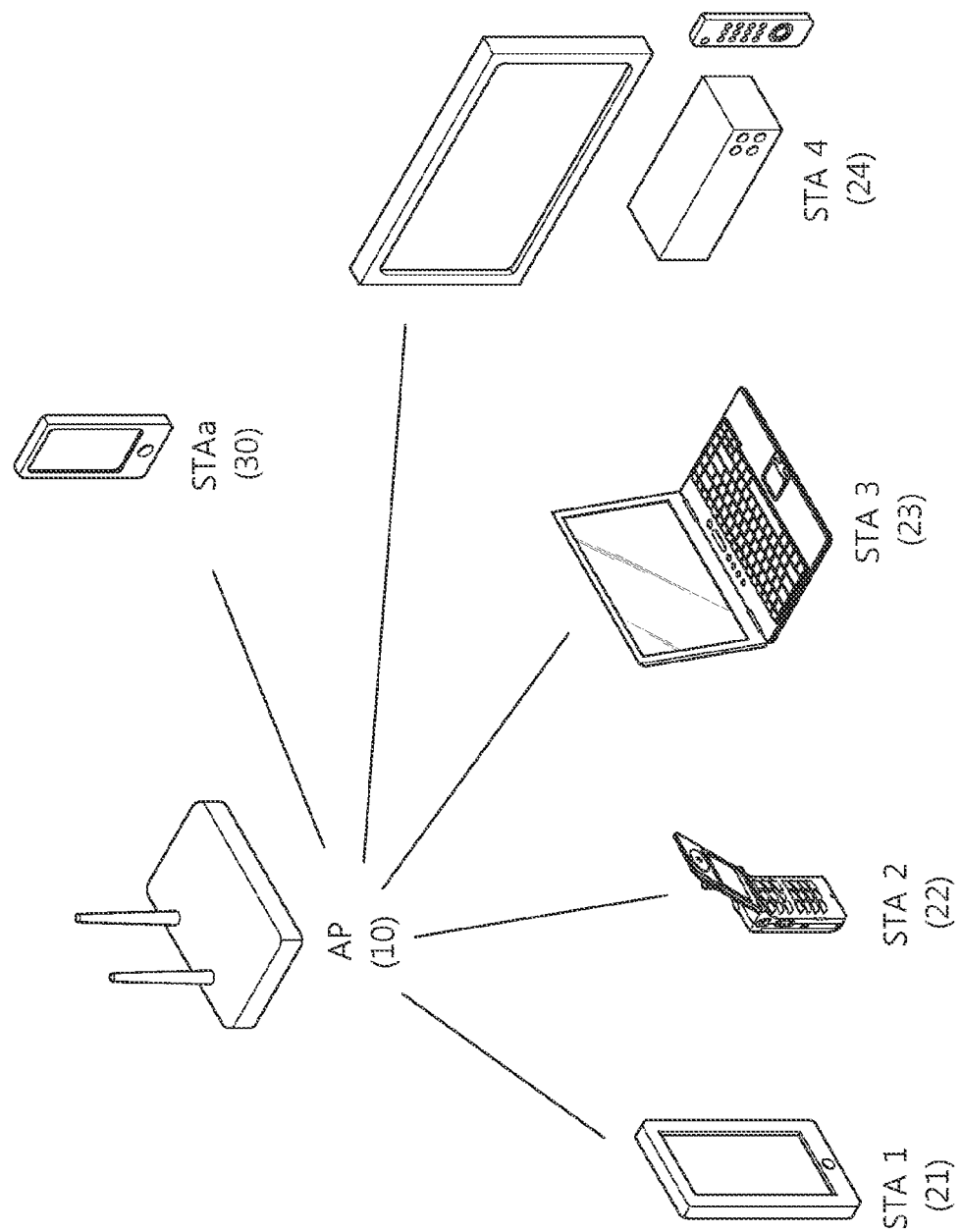
FIG. 1 shows an example of a structure of a wireless local area network (WLAN) system.

FIG. 1 shows an example of a structure of a wireless local area network (WLAN) system.

Referring to FIG. 1, the WLAN system includes one or more basic service sets (BSS). The BSS is a set of stations (STA) which are successfully synchronized to communicate with each other, is not a concept indicating a specific area.

An infrastructure BSS includes one or more non-AP STAs, access points (AP) providing a distribution service (DS), and a DS connecting the plurality of APs. In the infrastructure BSS, the AP manages the non-AP STAs of the BBS. On the other hand, an independent BSS (IBSS) is a BSS operating in an ad-hoc mode. Since the IBSS does not include the AP, there is no centralized management entity. That is, in the IBSS, the non-AP STAs are managed in a distributed manner. In the IBSS, all the STAs may be configured by mobile STAs and do not access the DS to form a self-contained network.

The STA is any functional medium including a media access control (MAC) and a physical layer interface for a wireless medium following regulations of the IEEE 802.11 standard, and more widely includes both the AP and the non-AP STA.

The non-AP STA is a STA which is not the AP, and may be called another name such as a mobile terminal, a wireless device, a wireless transmit/receive unit (WTRU), a user equipment (UE), a mobile station (MS), a mobile subscriber unit, or a simple user. Hereinafter, for convenience of description, the non-AP STA is referred to as the STA.

The AP is a functional entity which provides access for the distribution system via the wireless medium for the STA associated with the corresponding AP. Communication between the STAs in the infrastructure BSS including the AP is performed via the AP, but in the case where a direct link is set, direct communication between the STAs is possible. The AP may also be called a central controller, a base station (BS), a NodeB, a base transceiver system (BTS), a site controller, or the like.

A plurality of infrastructure BSSs including the BSS shown in FIG. 1 may be connected to each other through the distribution system. The plurality of BSSs connected to each other through the distribution system is called an extended service set (ESS). The AP and/or the STAs included in the ESS may communicate with each other, and in the same ESS, the STAs may move from one BSS to another BSS while continuously communicating with each other.

In the WLAN system according to the IEEE 802.11, a basic access mechanism of the MAC is a carrier sense multiple access with collision avoidance (CSMA/CA) mechanism. The CSMA/CA mechanism is also called a distributed coordination function (DCF) of the IEEE 802.11 MAC, and basically, adopts a "listen before talk" access mechanism. According to such an access mechanism, the AP and/or the STA sense a wireless channel or a medium before stating the transmission. As a result, when the medium is determined as an idle status, frame transmission starts through the corresponding frame. On the contrary, when the medium is sensed as an occupied status, the corresponding AP and/or the STA does not start self-transmission, but waits after setting a delay period for medium access.

The CSMA/CA mechanism includes virtual carrier sensing in addition to physical carrier sensing in which the AP and/or the STA directly senses the medium. The virtual carrier sensing is to compensate a problem occurring due to the medium access, such as a hidden node problem. For the virtual carrier sensing, the MAC of the WLAN system uses a network allocation vector (NAV). The NAV is a value in which the AP and/or the STA using a current medium or having authority for use indicates a remaining time until the medium can be used to another AP and/or STA. Accordingly, the value set to the NAV corresponds to a period when the use of the medium is scheduled by the AP and/or the STA transmitting the corresponding frame.

The AP and/or the STA may perform a process of exchanging a request to send (RTS) frame and a clear to send (CTS) frame in order to inform accessing the medium. The RTS frame and the CTS frame include information indicating a temporal period reserved to access the wireless medium which is required to transmit and receive an acknowledgement (ACK) frame when substantial data frame transmission and an acknowledgement are supported. Another STA receiving the RTS frame transmitted from the AP and/or the STA to transmit the frame or receiving the CTS frame transmitted from the STA as a frame transmission target may be set so as not to access the medium for the temporal period indicated by the information included in the RTS/CTS frames. This may be implemented by setting the NAV for the temporal period.

Unlike an existing WLAN system, the next-generation WLAN system requires a higher throughput. The higher throughput is referred to as the very high throughput (VHT), and to this end, the next-generation WLAN system supports transmission of bandwidths of contiguous 160 MHz and non-contiguous 160 MHz and/or transmission of bandwidths of contiguous 160 MHz or more and non-contiguous 160 MHz or more. Further, for the higher throughput, a multi user (MU) multiple-input multiple-output (MIMO) transmission method is provided. In the next-generation WLAN system, the AP may simultaneously transmit a data frame to one or more STAs which are MIMO-paired. In the WLAN system shown in FIG. 1, an AP 10 may simultaneously transmit data to a STA group including one or more STAs among a plurality of STAs 21, 22, 23, 24, and 30 associated with the AP 10. In this case, the data transmitted to the respective STAs may be transmitted through different spatial streams. The data frame transmitted by the AP 10 may be a physical layer convergence procedure (PLCP) protocol data unit (PPDU) generated and transmitted from a physical layer (PHY) of the WLAN system. In an example of the present invention, the transmission target STA group which is MU-MIMO-paired with the AP 10 is assumed as an STA1 21, an STA2 22, an STA3 23, and an STA4 24. In this case, the spatial stream is not allocated to a specific STA of the transmission target STA group and thus the data may not be transmitted. Meanwhile, an STAa 30 is coupled with the AP, but is assumed as an STA which is not included in the transmission target STA group.

Figure 2:
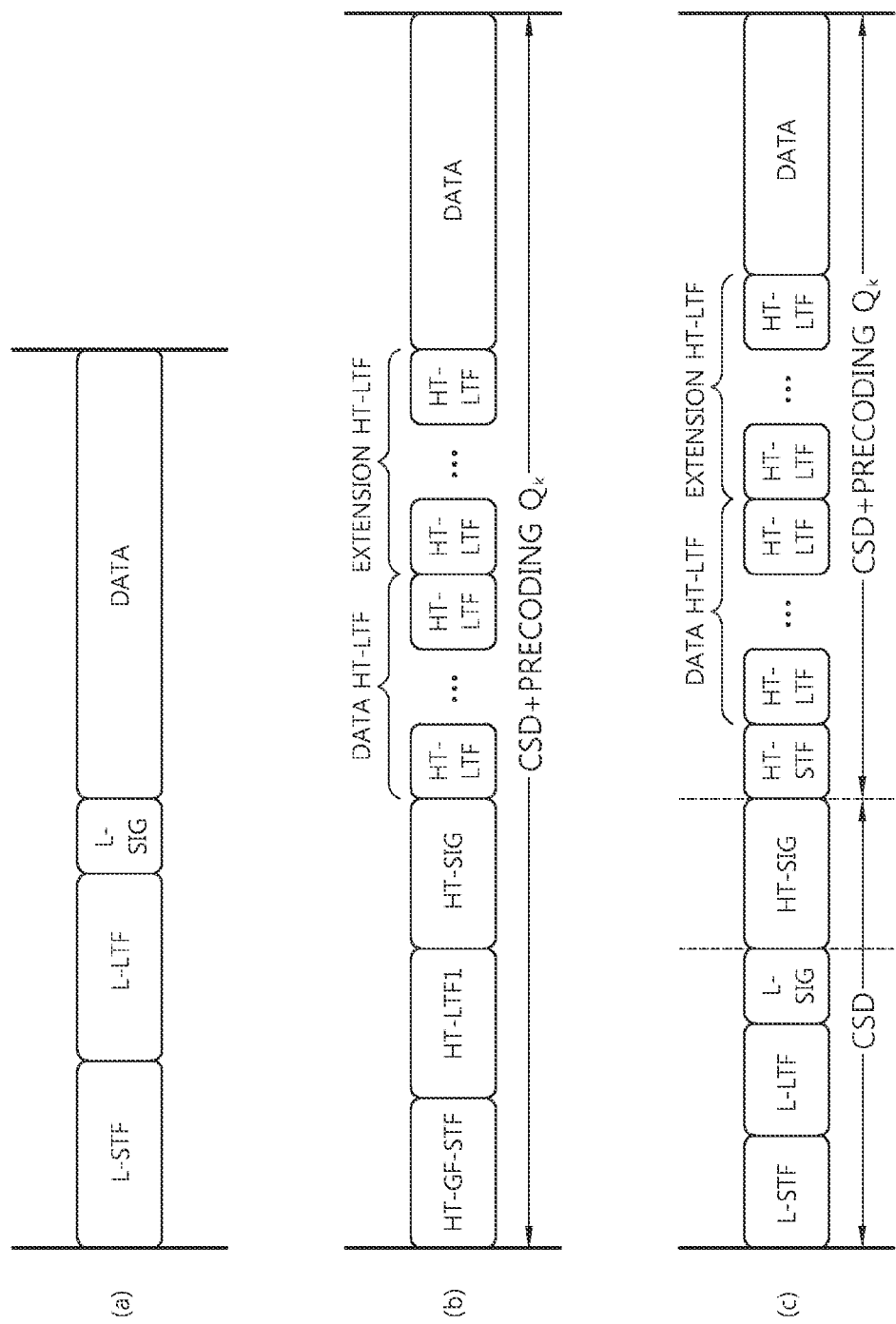
FIG. 2 shows a structure of a PCLP frame of IEEE 802.11n.

FIG. 2 shows a structure of a PCLP frame of IEEE 802.11n.

FIG. 2-(a) shows an example of a legacy PLCP frame of the IEEE 802.11n. An IEEE 802.11n high throughput (HT) system supports the legacy PLCP frame supporting an IEEE 802.11a, an IEEE 802.11b, and an IEEE 802.11g corresponding to the legacy. That is, the legacy PLCP frame supports legacy nodes. Referring to FIG. 2-(a), the legacy PLCP frame includes a legacy short training field (L-STF), a legacy long training field (L-LTF), a legacy signal (L-SIG), and data. In the legacy PLCP frame, the L-SFT, the L-LTF, the L-SIG, and the data may be transmitted in sequence. The L-STF may be used for frame timing acquisition and automatic gain control convergence. The L-LTF may be used for channel estimation for demodulating the L-SIG and the data. The L-SIG may include information for demodulating and decoding the data.

FIG. 2-(b) shows an example of an HT green field PCLP frame of the IEEE 802.11n. When the wireless communication system is configured by only an IEEE 802.11n HT STAs, the HT green field PCLP frame effectively designed for the HT STA may be used. Referring to FIG. 2-(b), the HT green field PCLP frame includes an HT green field short training field (HT-GF-STF), an HT long training field (HT-LTF), an HT signal (HT signal), and data. In the HT green field PCLP frame, the HT-GF-STF, the HT-LTF, the HT-SIG, and the data may be transmitted in sequence. The HT-GT-STF may be used for frame timing acquisition and automatic gain control convergence. The HT-LTF may be used for the channel estimation for demodulating the HT-SIG and the data. The HT-LTF may include a data HT-LTF and an extension HT-LTF. The HT-SIG may include information for demodulating and decoding the data. The HT green field PCLP frame may be pre-coded and transmitted.

FIG. 2-(c) shows an example of an HT mixed mode PCLP frame of the IEEE 802.11n. In the wireless communication system including the legacy nodes and the IEEE 802.11n HT STAs, the HT mixed mode PCLP frame for supporting the IEEE 82.11n HT may be used. Referring to FIG. 2-(c), the HT mixed mode PCLP frame may include elements of the legacy PLCP frame of FIG. 2-(a) and elements of the HT green field PLCP frame of FIG. 2-(b). That is, the HT mixed mode PCLP frame includes the L-STF, the L-LTF, the L-SIG, the HT-SIG, the HT-STF, the HT-LTF, and the data. The L-STF, the L-LTF, and the L-SIG may be first transmitted so that the legacy nodes may receive the HT mixed mode PCLP frame. In addition, the HT-SIG including the information for demodulating and decoding the data is transmitted, and the HT-STF, the HT-LTF, and the data for the IEEE 802.11n HT STAs may be transmitted in sequence. In this case, the L-STF to the HT-SIG may be transmitted in a non-beamforming scheme so that various STAs including the legacy nodes may receive the information, and the HT-STF to the data may be transmitted through the pre-coding. The STA receiving the information through the pre-coding may consider that power is changed by pre-coding through the HT-STF.

In order to effectively use a given channel in the IEEE 802.11, a MU-MIMO technology of simultaneously scheduling a plurality of STAs and transmitting the data may be applied. The MU-MIMO may be introduced to the IEEE 802.11ac. For supporting the MU-MIMO, the AP needs to inform a fact that the data is transmitted through the specific spatial stream to the corresponding STAs, and the corresponding STAs actually need to able to receive the data through the corresponding spatial stream.

To this end, a VHT specific signal within a PLCP preamble header of the respective frames transmitted through the MU-MIMO may include a signal indicating the STAs to be received through the MU-MIMO and a signal indicating the number of spatial streams for each spatial stream position with the respect to the signal to be received by the corresponding STAs. The signal indicating the STAs to be received through the MU-MIMO may be referred to as a group identifier (ID) indicator, and the signal indicating the number of spatial streams may be referred to as a spatial stream indicator.

Figure 3:
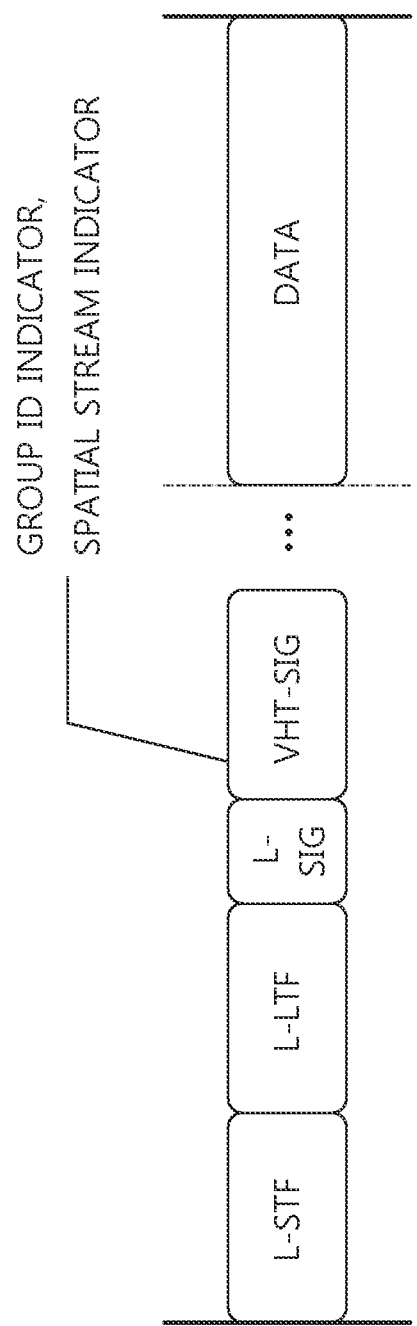
FIG. 3 shows an example of a structure of a PCLP frame of IEEE 802.11ac.

FIG. 3 shows an example of a structure of a PCLP frame of IEEE 802.11ac.

The VHT mixed mode PCLP frame of FIG. 3 may further include a VHT-SIG with respect to the HT mixed mode PCLP frame of FIG. 2-(c). The VHT-SIG may include a group ID indicator and a spatial stream indicator. Generally, the group ID indicator may carry information on which STAs needs to receive the MU-MIMO transmission transmitted from the AP, and each group ID and the STA may be logically connected to each other. The AP may inform the STAs connected with the specific group ID through the group ID management frame before performing the MU-MIMO transmission.

FIG. 4 shows an example of a structure of a group ID management frame. FIG. 4-(a) shows an example of a structure of a group ID management frame. The group ID management frame may be transmitted by the AP in order to allocate or change a user's position corresponding to one or more group IDs. The AP may transmit the group ID management frame to each of the grouped STAs in a unicast manner. The group ID management frame includes a group ID management information element. FIG. 4-(b) shows an example of a structure of the group ID management information element. The group ID management information element includes an element ID, a length, and a spatial stream position for each group ID.

The group ID management frame indicates whether the corresponding STA belongs to each group with respect to all group IDs, and the position of the spatial stream if the corresponding STA belongs to the corresponding group. For example, when values of the spatial stream position in the group ID management information element received by the STA are 0, 1, 2, 4, 0, 0, 0, . . . , 0, 0, and 0, it is indicated that the corresponding STA belongs to the a group ID 2, a group ID 3, and a group ID 4. Further, in the group ID 2, the position of the spatial stream is the first, in the group ID 3, the position of the spatial stream is the second, and in the group ID 4, the position of the spatial stream is the fourth. The position of the spatial stream means that the STA needs to receive the signal corresponding to the corresponding spatial stream position when receiving the frame having the corresponding group ID. Accordingly, when the STA receives a frame having the group ID 3, the corresponding STA receives the signal corresponding to the second spatial stream. When the STA receives a frame having the group ID 4, the corresponding STA receives the signal corresponding to the fourth spatial stream. When the STA receives the frame having the group ID 4, since the corresponding STA does not belong to the group ID 1, the corresponding frame is ignored.

Meanwhile, since the AP and/or the STA performing the MU-MIMO transmission requires channel information for each transmission target STA, a channel sounding process for acquiring the channel information is required. As the channel sounding process, two schemes may be largely supported. One scheme is a scheme through a general PPDU with the data field, and the other scheme is a scheme through a null data packet (NDP) without the data filed. Hereinafter, the NDP may be called a sounding frame.

Figure 5:
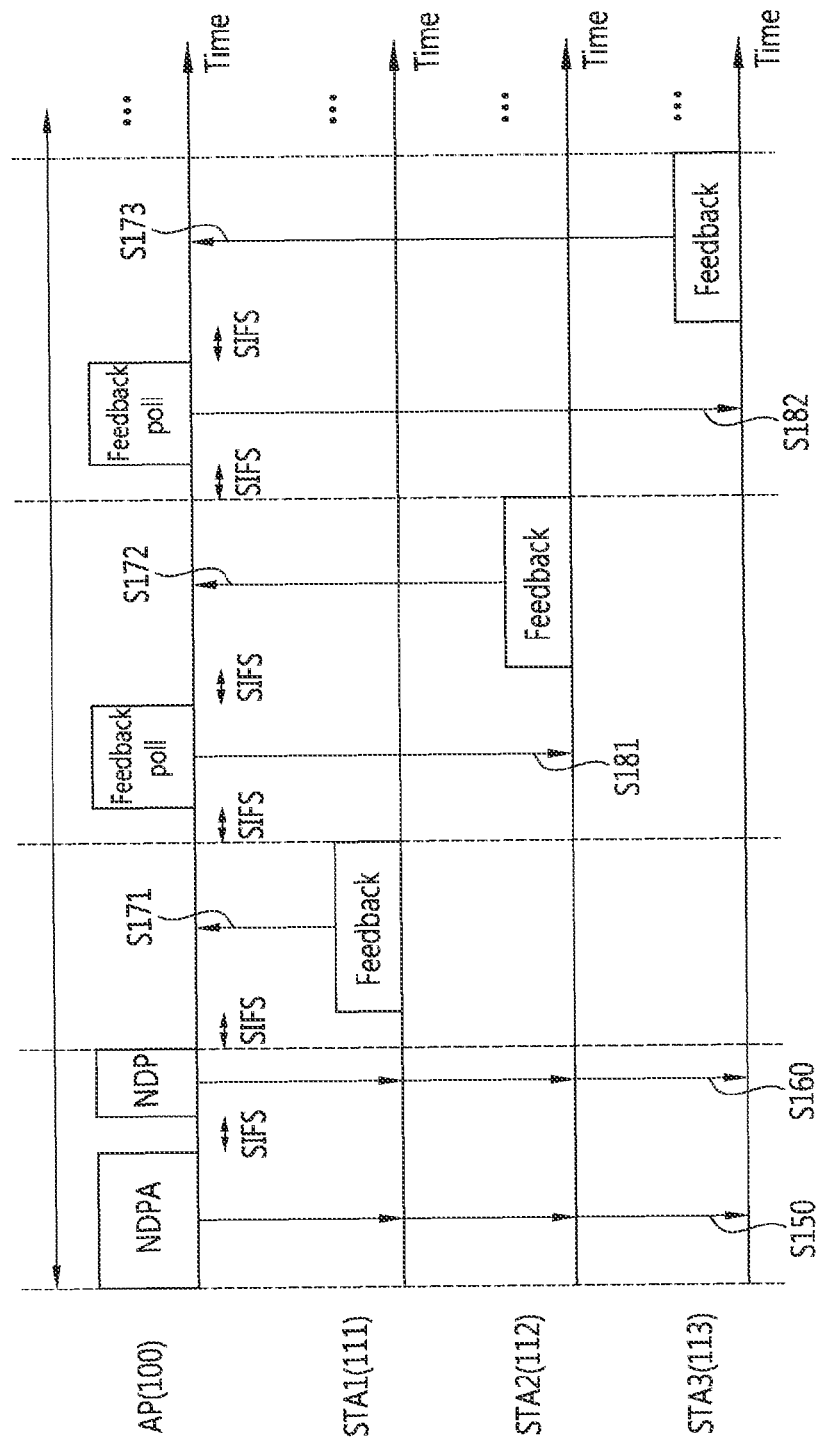
FIG. 5 is a diagram showing a channel sounding method using a NDP in IEEE 802.11ac.

FIG. 5 is a diagram showing a channel sounding method using a NDP in IEEE 802.11 ac. In the embodiment, the AP performs the channel sounding with respect to three transmission target STAs for transmitting the data to the three transmission target STAs, but is not limited thereto. The AP may also perform the channel sounding with respect to one STA.

Referring to FIG. 5, at step S50, an AP 100 transmits an NDP announcement (NDPA) frame to an STA1 111, an STA2 112, and an STA3 113. The NDPA frame corresponds to an NDP which is subsequently transmitted to inform information for identifying an STA to transmit a feedback frame. The AP 100 transmits an STA information field including the information on a sounding target STA included in the NDPA frame. One STA information field may be included in each sounding target STA. The NDPA frame may be called a sounding announcement frame.

The AP 100 broadcasts the NDPA frame, when the NDPA frame is transmitted to one or more sounding target STAs for MU-MIMO channel sounding, as shown in FIG. 5. On the contrary, when the NDPA frame is transmitted to one sounding target STA for SU-MIMO channel sounding, receiver's address information included in the NDPA frame is set to a MAC address of the corresponding sounding target STA to be transmitted in a unicast manner.

Table 1 shows an example of an STA information field format included in the NDPA frame.

TABLE 1

| Sub field | Description |
|---|---|
| AID | Include AID of sounding target station |
| Feedback type | Indicate feedback request type for sounding target station<br>In the case of SU-MIMO, '0'<br>In the case of MU-MIMO, '1' |
| Nc index | Indicate required feedback dimension<br>In the case of MU-MIMO,<br>If Nc = 1, set to '0'<br>If Nc = 2, set to '1'<br>If Nc = 3, set to '2'<br>If Nc = 4, set to '3'<br>If Nc = 5, set to '4'<br>If Nc = 6, set to '5'<br>If Nc = 7, set to '6'<br>If Nc = 8, set to '7'<br>In the case of SU-MIMO, reserved subfield (set to 0) |

In Table 1, Nc represents the column number of beamforming feedback matrices in the feedback information which the sounding target STA transmits to the AP as as response to the NDP after receiving the NDP.

Upon receiving the NDPA frame, the STAs may verify an AID subfield value included in the STA information field and verify whether the STAs are the sounding target STAs. In the embodiment of FIG. 5, in the NDPA frame, an STA information field including the AID of the STA1 111, an STA information field including the AID of the STA2 112, and an STA information field including the AID of the STA 3 113 may be included.

At step S160, the AP 100 transmits the NDP frame to the sounding target STA after the NDPA frame transmission. The NDP frame is beam-formed by an AP 310, and transmitted to the sounding target STA through at least one spatial stream. Accordingly, the sounding target STAs 111, 112, and 113 may estimate the channel based on the VHT-LTF of the NDP.

As control information included in the NDP frame during the NDP frame transmission, length information indicating a length of PHY service data unit (PSDU) included in the data field, or a length of an aggregate-MAC protocol data unit (A-MPDU) included in the PSDU may be set to 0, and information indicating the number of transmission target STAs of the NDP frame may be set to 1. The group ID indicating whether a transmission method used for the NDP frame transmission is the MU-MIMO or the SU-MIMO, and indicating the transmission target STA group may be set to a value indicating the SU-MIMO transmission. Information indicating the number of spatial streams allocated to the transmission target STA may be set to indicate the number of spatial streams transmitted to the transmission target STA through the MU-MIMO or the SU-MIMO. Channel bandwidth information may be set to a bandwidth value used for the NDPA frame transmission.

At step S171, the STA1 111 transmits the feedback frame to the AP 100. The channel bandwidth information used for the feedback frame transmission may be set smaller than or equal to the channel bandwidth used for the NDPA frame transmission.

At step S181, the AP 100 transmits a feedback poll frame to the STA2 112 after receiving the feedback frame from the STA1 111. The feedback poll frame is a frame for requesting the feedback frame transmission by the received STA. The feedback poll frame is transmitted to the STA to request the feedback frame transmission in a unicast manner. At step S172, the STA2 112 receiving the feedback poll frame transmits the feedback frame to the AP 100. Next, at step S182, the AP 100 transmits the feedback poll frame to the STA3 113, and at step S173, the STA3 113 transmits the feedback frame corresponding to the feedback poll frame to the AP 100.

In the WLAN system, the channel bandwidth transmitting the data may be various. In order to estimate the channel for various bandwidths, channel information for various bandwidths may be fed-back. In the next-generation WLAN system, bandwidths of 20 MHz, 40 MHz, 80 MHz, contiguous 160 MHz, and non-contiguous 160(80+80) MHz are supported. Accordingly, since the channel information for each bandwidth is fed-back, the channel feedback information may be increased.

In the present invention, the channel information according to channel estimation performed by the STA is included in the feedback frame transmitted to the AP by the STA. The feedback frame includes a channel information field and a channel information control field. Table 2 and Table 3 show formats of the channel information field and the channel information control field.

TABLE 2

| Sub field | Description |
| --- | --- |
| Nc index | Indicate the number of columns of beamforming feedback matrix<br>If Nc = 1, 0<br>If Nc = 2, 1<br>...<br>If Nc = 8, 7 |
| Nr index | Indicate the number of rows of beamforming feedback matrix<br>If Nr = 1, 0<br>If Nr = 2, 1<br>...<br>If Nr = 8, 7 |
| Channel bandwidth | Indicate bandwidth of estimated channel<br>If 20 MHz, 0<br>If 40 MHz, 1<br>If 80 MHz, 2<br>If 160 MHz or 80 + 80 MHz, 3 |
| Grouping (Ng) | The number of carriers for grouping<br>If Ng = 1, 0<br>If Ng = 2, 1<br>If Ng = 4, 2<br>(3 is set in reserve) |
| Code book information | Indicate size of code entries |
| MU-mode | Indicate whether beamforming feedback for SU-MIMO or beamforming feedback for MU-MIMO |
| Sounding sequence | Sequence numerals from NDPA requiring feedback |

TABLE 3

| Sub field | Description |
| --- | --- |
| signal to noise ratio (SNR) of spatial stream 1 | Average SNR on subcarriers in receiver for first spatial stream |
| ... | ... |
| SNR of spatial stream Nc | Average SNR on subcarriers in receiver for spatial spatial stream Nc |
| Beamforming feedback matrix (Subcarrier index 0) | Order of angle of beamforming feedback matrix for corresponding subcarrier |
| Beamforming feedback matrix (Subcarrier index 1) | Order of angle of beamforming feedback matrix for corresponding subcarrier |
| ... | ... |
| Beamforming feedback matrix (Subcarrier index Ns) | Order of angle of beamforming feedback matrix for corresponding subcarrier |

Hereinafter, user grouping for improving performance of the MU-MIMO transmission will be described.

In the IEEE 802.11ac, 6 bits may be used as the group ID for MU-MIMO. Except the group ID used for the SU-MIMO, the number of group IDs for MU-MIMO is limited to maximum 63. Meanwhile, the number of group sets according to the number of users becomes $$\sum_{k=2}^{4} \binom{N}{k}.$$

That is, as the number of users increases, the number of necessary group IDs increases exponentially, and the number of group IDs may be insufficient. The AP may select the user using orthogonal pre-coding during the MU-MIMO scheduling to perform the scheduling. For example, the scheduling may be performed by a per user unitary rate control (PU2RC) scheme.

Various elements may be considered during the user grouping for the MU-MIMO transmission. The various elements considered during the user grouping may include a capacity of the STA, interference, a pathloss, etc. The various elements need to be accurately estimated based on a reference, and the user grouping needs to be implemented by a small overhead while maintaining the accuracy by considering the various elements. Further, the user grouping needs to be implemented by a protocol within a predetermined standard.

Meanwhile, according to a channel model of the IEEE 802.11n, a position between users may be element to be most importantly considered during the user grouping. In the IEEE 802.11n, the MIMO channel model may be expressed by a correlation matrix function. Equation 1 represents a channel model expressed by the correlation matrix function.

$$H_n = \sqrt{\eta}\sqrt{R_{rx}}W_n\sqrt{R_{tx}} \quad \text{[Equation 1]}$$

In Equation 1, $\eta$ represents a pathloss of a linear scale, $R_{rx}$ represents a reception antenna correlation matrix, $R_{tx}$ represents a transmission antenna correlation matrix, and $W_n$ represents random complex Gaussian matrix of which an average is 0 and a distribution is 1.

Figure 6:
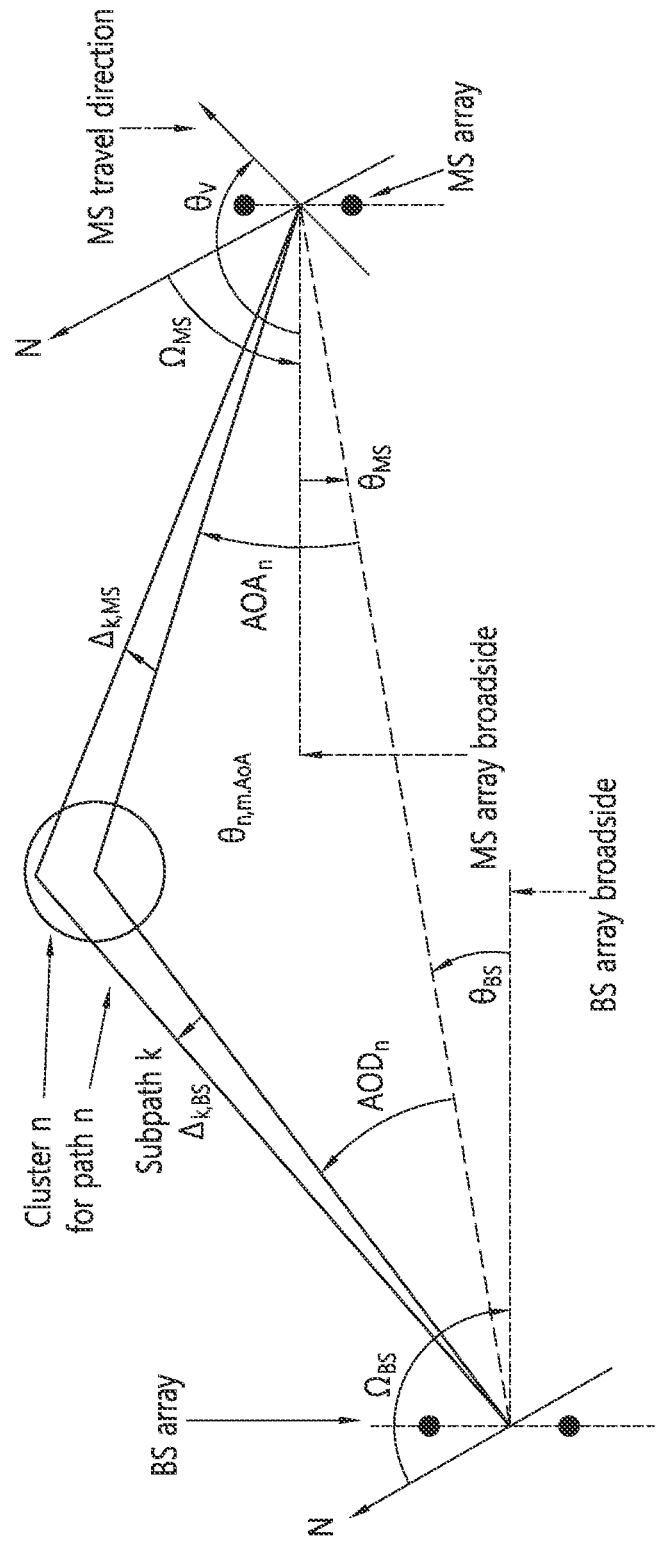
FIG. 6 shows an angle parameter in a MIMO channel model.

FIG. 6 shows an angle parameter in a MIMO channel model.

The correlation matrix may be largely influenced by the user's position. Particularly, the correlation matrix may be largely influenced by $\theta_{BS}$ and $\theta_{MS}$ determined by the user's position. Equation 2 represents an equation calculating the transmission antenna correlation matrix and the reception antenna correlation matrix.

$$R_{tx} = [r_{BS}(i, j)]_{1 \leq i, j \leq N_{tx}} \quad \text{[Equation 2]}$$

$$R_{rx} = [r_{MS}(i, j)]_{1 \leq i, j \leq N_{rx}}$$

where $$r_{BS}(p, q) = \frac{1}{20}\sum_{k=1}^{20} \exp\left\{j\frac{2\pi d_{BS}}{\lambda}(p-q)\sin(AOD + \Delta_k AS_{BS} + \theta_{BS})\right\}$$

$$r_{MS}(p, q) = \frac{1}{20}\sum_{k=1}^{20} \exp\left\{j\frac{2\pi d_{MS}}{\lambda}(p-q)\sin(AOA + \Delta_k AS_{MS} + \theta_{MS})\right\}$$

In Equation 2, $N_{tx}$ represents the number of transmission antennas, and $N_{rx}$ represents the number of reception antennas.

Meanwhile, an MU-MIMO capacity region may be expressed by Equation 3.

$$C_{MU-MIMO} = \bigcup_{\{R_k \geq 0, Tr(R_k) \leq P_k\ \forall k\}} \left\{ \begin{array}{c} (C_1, \ldots, C_K): \\ \sum_{k \in S} C_k \leq \log_2 \det\left(I + \sum_{k \in S} H_k^* R_k H_k\right) \ \forall S \subseteq \{1, \ldots, K\} \end{array} \right\}$$

[Equation 3]

In Equation 3, K represents a maximum number of users, $R_k$ represents an 8-th user covariance matrix, and $H_k$ represents a k-th user channel matrix. $H_k^*$ represents a conjugate transpose matrix of $H_k$.

Further, when equal power allocation and a precoding matrix is assumed as a unitary matrix, the bound of an MU-MIMO sum capacity may be expressed as Equation 4.

$$C_{MU-MIMO_{SUM}} \leq \log_2 \det\left(I + \sum_{k=1}^{K} H_k^* R_k H_k\right) =$$

[Equation 4]

$$\log_2 \det\left(I + \frac{SNR}{N_t} \sum_{k=1}^{K} H_k^* H_k\right)$$

In this case, $R_k = SNR/N_t \cdot I$.

For performance analysis of a fading channel, a user set having averagely high performance may be selected by using a bound of a time-averaged MU-MIMO sum capacity. Equation 5 represents a bound of the time-averaged MU-MIMO sum capacity.

$$\overline{C}_{MU-MIMO_{SUM}} \leq E_T\left[\log_2 \det\left(I + \frac{SNR}{N_t} \sum_{k=1}^{K} H_k^* H_k\right)\right]$$

[Equation 5]

In Equation 5, $E_T$ represents an average value for a time T.

The user set having averagely high performance may be selected by using the time-averaged MU-MIMO sum capacity, but it is difficult to measure the time-averaged MU-MIMO sum capacity. First, since information on all user sets for all time units is required, a lot of information amounts are required, and as a result, a calculating amount may be excessively increased. Further, users in the same group are measured for the same time, and actually, since timings when the users perform the channel sounding may be different from each other, the timing may have an effect on accurate calculation. In addition, since the acquired information may not independently be used without cooperation between the users, it is ineffective and it is difficult to implement a protocol.

Accordingly, the present invention provides a method of more effectively calculating a bound of the time-averaged MU-MIMO sum capacity. The present invention provides a new method of calculating a bound of the time-averaged MU-MIMO sum capacity by using Jensens' inequality. The new bound of the time-averaged MU-MIMO sum capacity may be expressed as Equation 6.

$$\overline{C}_{MU-MIMO_{SUM}} \leq C_{MU-MIMO_{bound}} =$$

[Equation 6]

$$\log_2 \det\left(I + \frac{SNR}{N_t} \sum_{k=1}^{K} E_T[H_k^* H_k]\right)$$

Referring to FIG. 6, in order to calculate the bound of the time-averaged MU-MIMO sum capacity, information of $E_T[H_k^* H_k]$ of each user is required. Since the information is an average value for a time T of the k-th user, the information may be channel status information measured in the long term. The information may be referred to as long-term channel state information (LCSI). By Equation 6, the bound of the time-averaged MU-MIMO sum capacity may be calculated by independently acquiring information for each user without information on all user sets. Further, when the present invention is applied, an operation is possible at a smaller protocol overhead to acquire relatively higher accuracy with respect to overhead.

Figure 7:
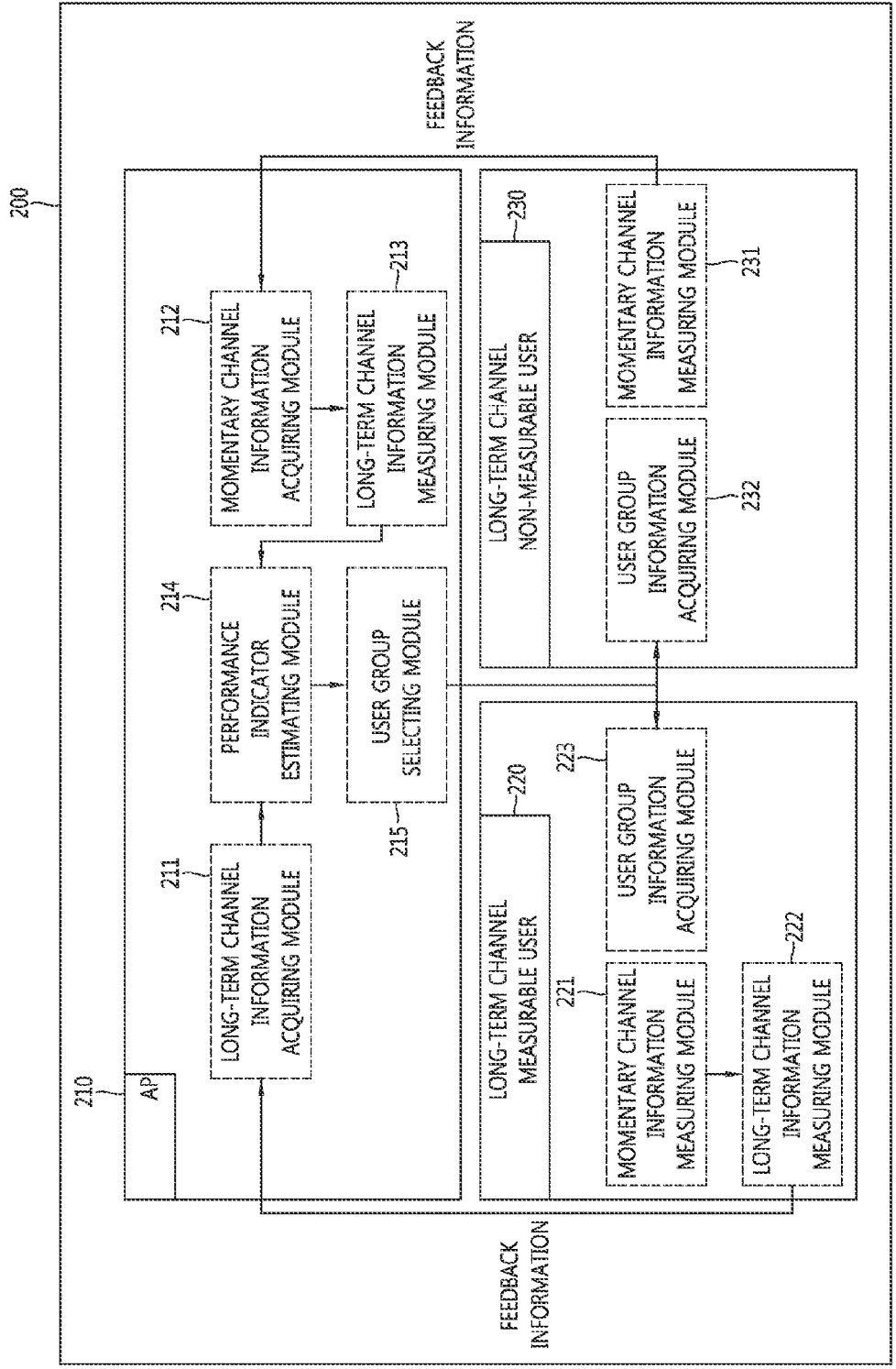
FIG. 7 is a block diagram of a WLAN system in which the proposed method for measuring a channel is implemented.

FIG. 7 is a block diagram of a WLAN system in which the proposed method for measuring a channel is implemented.

Referring to FIG. 7, an AP 210 includes a long-term channel information acquiring module 211, a momentary channel information acquiring module 212, a long-term channel information measuring module 213, a performance indicator estimating module 214, and a user group selecting module 215. The AP 210 acquires long-term channel information from a long-term channel measurable user 220 and estimates a performance indicator based on the acquired long-term channel information to select a user group. Alternatively, the AP 210 may acquire momentary channel information from a long-term channel non-measurable user 230, estimate a performance indicator by measuring the long-term channel information based on the acquired momentary channel information, and select a user group. The long-term channel measurable user 220 includes a momentary channel information measuring module 221, a long-term channel information measuring module 222, and a user group information acquiring module 223. The long-term channel measurable user 220 measures the momentary channel information and the long-term channel information to feed back the momentary channel information and the long-term channel information to the AP 210 and acquire user group information from the AP 210. The long-term channel non-measurable user 230 includes a momentary channel information measuring module 231, and a user group information acquiring module 232. The long-term channel non-measurable user 230 measures the momentary channel information to feed back the momentary channel information to the AP 210 and acquire user group information from the AP 210.

Hereinafter, proposed methods for measuring a channel according to various embodiments of the present invention will be described. First, a case of the long-term channel measurable user will be described.

Figure 8:
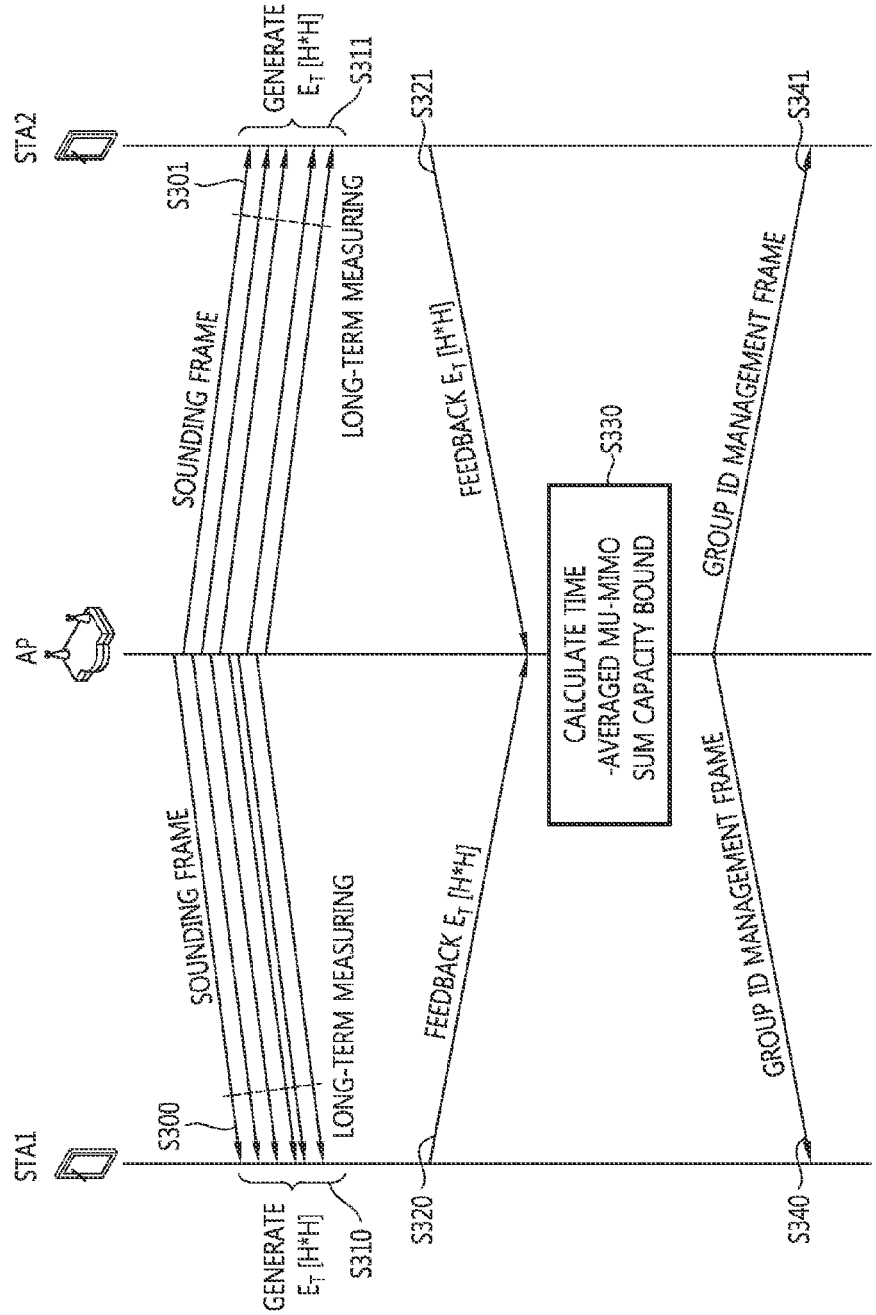
FIG. 8 shows an embodiment of the proposed method for measuring a channel.

FIG. 8 shows an embodiment of the proposed method for measuring a channel.

An AP transmits a sounding frame to a first STA STA1 (S300), and transmits a sounding frame to a second STA STA2 (S301). The STA1 estimates the sounding frame for a long time to generate $E_T[H^*H]$ (S310), and similarly, the STA2 estimates the sounding frame for a long time to generate $E_T[H^*H]$ (S311). The STA1 and the STA2 feedback the generated $E_T[H^*H]$ to the AP (S320 and S321). The AP calculates a bound of a time-averaged MU-MIMO sum capacity based on the received $E_T[H^*H]$ (S330). The AP transmits information on user grouping determined based on the calculated bound of the time-averaged MU-MIMO sum capacity to the STA1 and the STA2 through a group ID management frame (S340 and S341).

Each user uses the sounding frame transmitted to another user in addition to the sounding frame transmitted to the user for overheard channel estimation. Accordingly, the channel is more rapidly estimated to be fed back to the AP.

Figure 9:
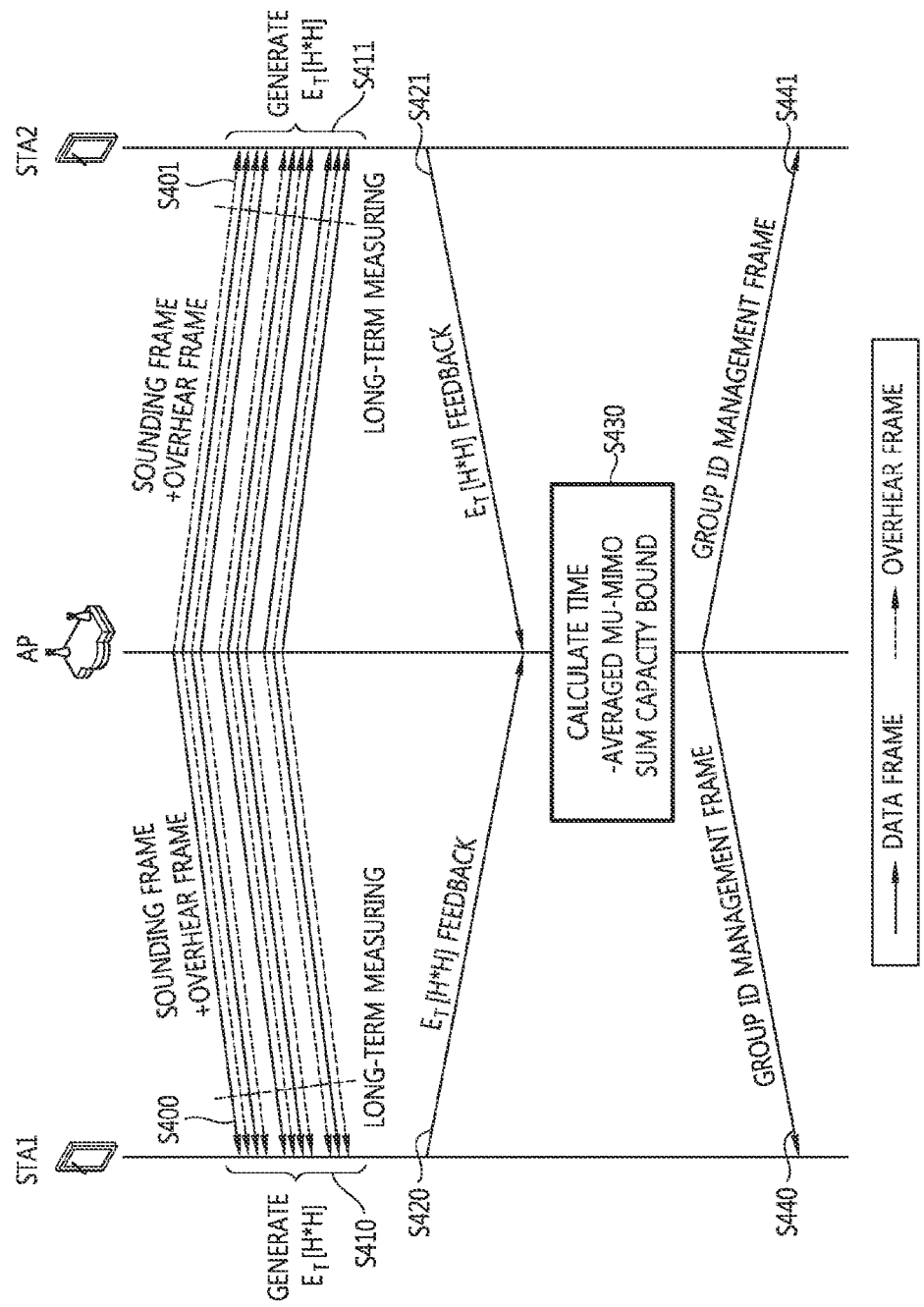
FIG. 9 shows another embodiment of the proposed method for measuring a channel.

FIG. 9 shows another embodiment of the proposed method for measuring a channel.

The AP transmits a sounding frame to the STA1 (S400), and transmits a sounding frame to the STA2 (S401). The STA1 estimates the sounding frame transmitted to the STA1 and an overhear sounding frame transmitted to the STA2 for a long time to generate $E_T[H^*H]$ (S410). Similarly, the STA2 estimates the sounding frame transmitted to the STA2 and an overhear sounding frame transmitted to the STA1 for a long time to generate $E_T[H^*H]$ (S411). The STA1 and the STA2 feedback the generated $E_T[H^*H]$ to the AP (S420 and S421). The AP calculates a bound of a time-averaged MU-MIMO sum capacity based on the received $E_T[H^*H]$ (S430). The AP transmits information on user grouping determined based on the calculated bound of the time-averaged MU-MIMO sum capacity to the STA1 and the STA2 through a group ID management frame (S440 and S441).

As shown in FIGS. 8 and 9, new frame and protocol need to be defined in order for each STA to estimate the sounding frame to generate the $E_T[H^*H]$, and to transmit the generated $E_T[H^*H]$ to the AP. Since the $E_T[H^*H]$ is a Hermitian matrix, only an upper triangle matrix needs to be transmitted. In this case, since a diagonal portion of the upper triangle matrix is a real number, assuming that $N_b$ bits are used when expressing one value, a total of $N_b \cdot N_t$ bits are required. Further, since a total of $N_t \cdot (N_t-1)/2$ elements exist at a complex number portion, a total of $N_b \cdot N_t \cdot (N_t-1)$ bits are required. Accordingly, like Table 4, an LCSI report field is defined, and may be transmitted through a VHT action frame.

TABLE 4

| Field | Size (bits) |
| --- | --- |
| LCSI matrix for carrier −28 | $N_b \cdot N_t \cdot (N_t - 1) + N_b \cdot N_t$ |
| ... | ... |
| LCSI matrix for carrier 28 | $N_b \cdot N_t \cdot (N_t - 1) + N_b \cdot N_t$ |

Next, a case of the long-term channel non-measurable user will be described.

Figure 10:
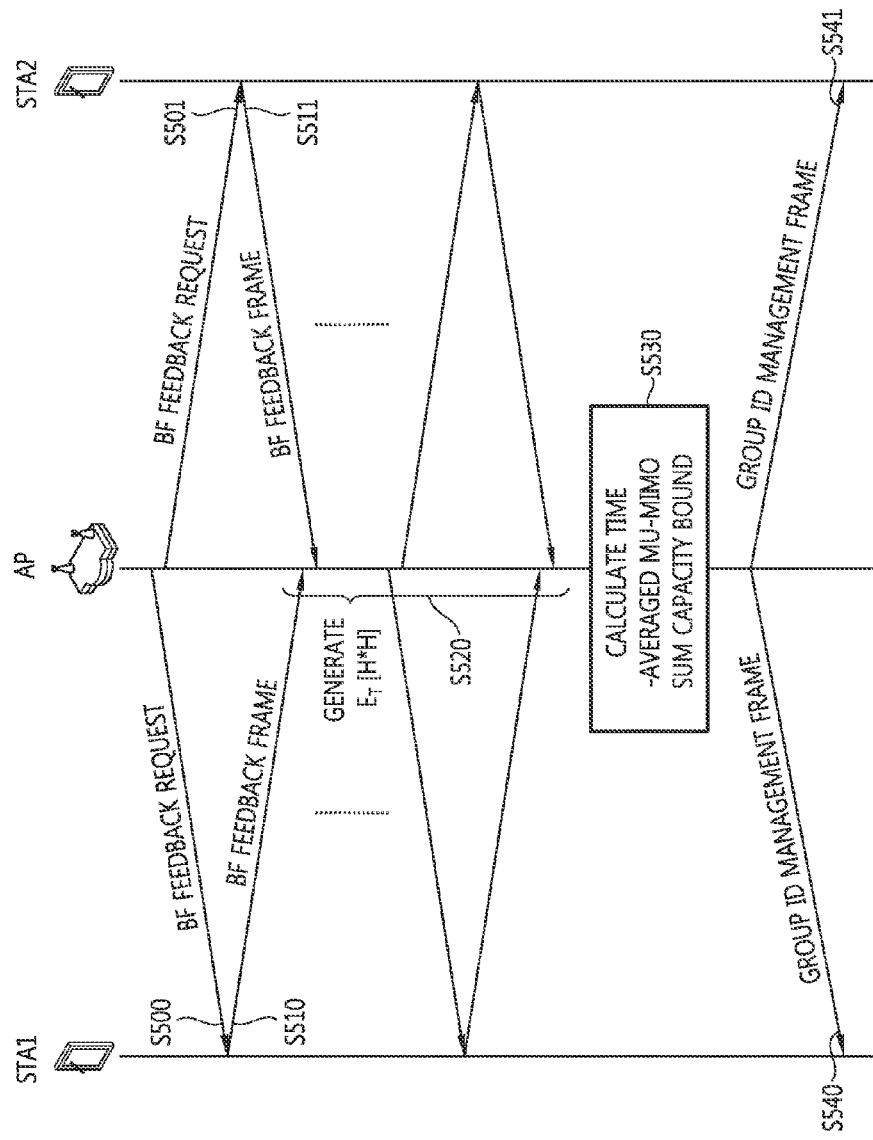
FIG. 10 shows another embodiment of the proposed method for measuring a channel.

FIG. 10 shows another embodiment of the proposed method for measuring a channel.

The AP transmits a beamforming (BF) feedback request to the STA1 (S500), and transmits the BF feedback request to the STA2 (S501). The STA1 transmits a BF feedback frame to the AP as a response to the BF feedback request (S510), and similarly, the STA2 also transmits a BF feedback frame to the AP as a response to the BF feedback request (S511). The BF feedback frame may be referred to as momentary channel information. The AP and the STAs periodically exchange the BF feedback request and a BF feedback response. The AP generates $E_T[H^*H]$ based on the BF feedback frame received from each STA (S520). The AP calculates a bound of a time-averaged MU-MIMO sum capacity based on the $E_T[H^*H]$ (S530). The AP transmits information on user grouping determined based on the calculated bound of the time-averaged MU-MIMO sum capacity to the STA1 and the STA2 through a group ID management frame (S540 and S541).

Further, the AP assumes a channel symmetry and may acquire the $E_T[H^*H]$ through an uplink (UL) sounding frame.

Figure 11:
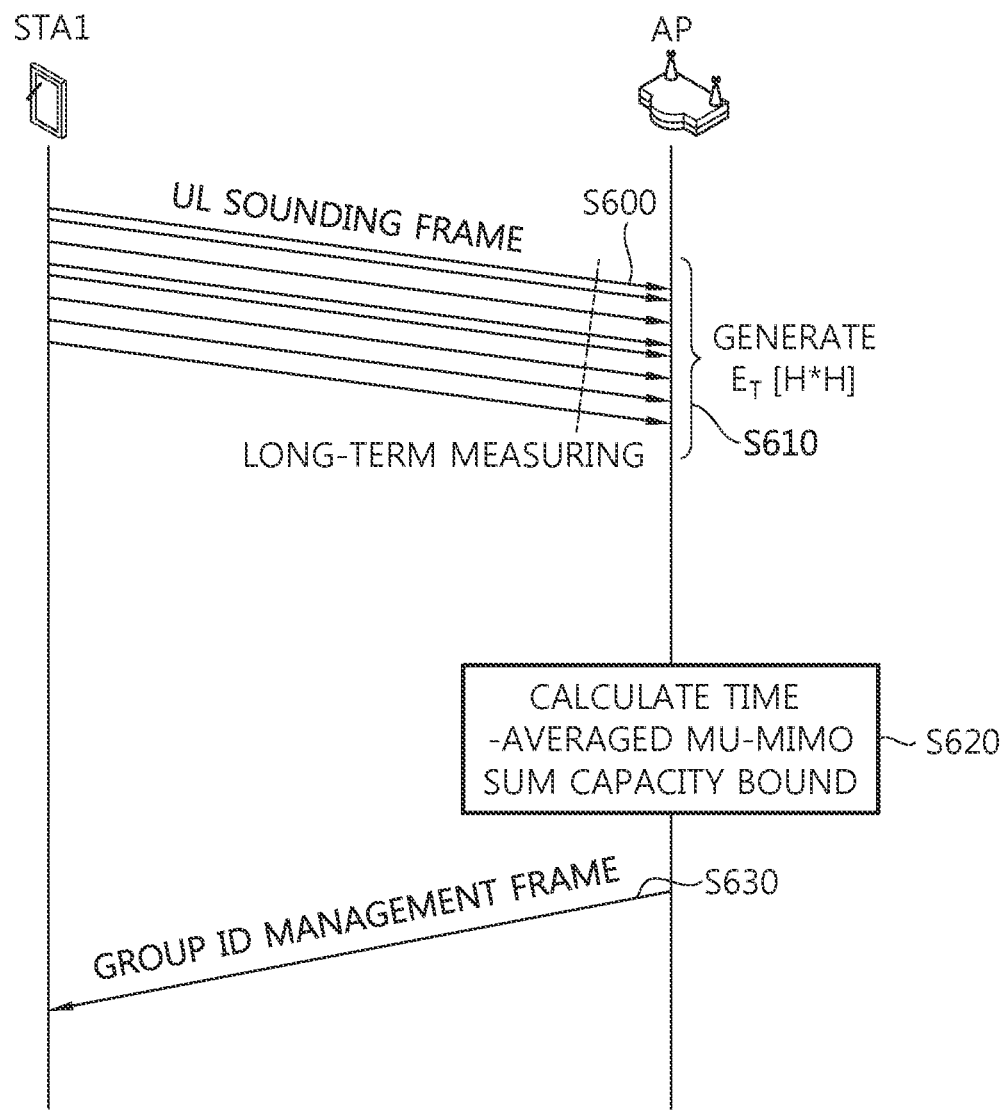
FIG. 11 shows another embodiment of the proposed method for measuring a channel.

FIG. 11 shows another embodiment of the proposed method for measuring a channel.

The STA1 transmits a UL sounding frame to the AP (S600), and the AP estimate the received UL sounding frame for a long time to generate $E_T[H^*H]$ (S610). The AP calculates a bound of a time-averaged MU-MIMO sum capacity based on the received $E_T[H^*H]$ (S620). The AP transmits information on user grouping determined based on the calculated bound of the time-averaged MU-MIMO sum capacity to the STA1 through a group ID management frame (S630).

Meanwhile, since the maximum number of group IDs allocated to the MU-MIMO is 63, as the number of users is increased, a method for managing the group IDs is required. As the method for managing the group IDs, two methods of a group overload method and a group selection method may exist. The group overload method is a method of managing a set of 63 or more user groups by allocating the multiple user groups to one group ID. The group selection method is a management method by selecting optimal 63 user groups. The group overload method has high possibility that most of users are included in all group IDs as the number of users is increased, and as a result, since most of users need to decode the received data stream, the group overload method is not suitable in terms of efficiency.

Figure 12:
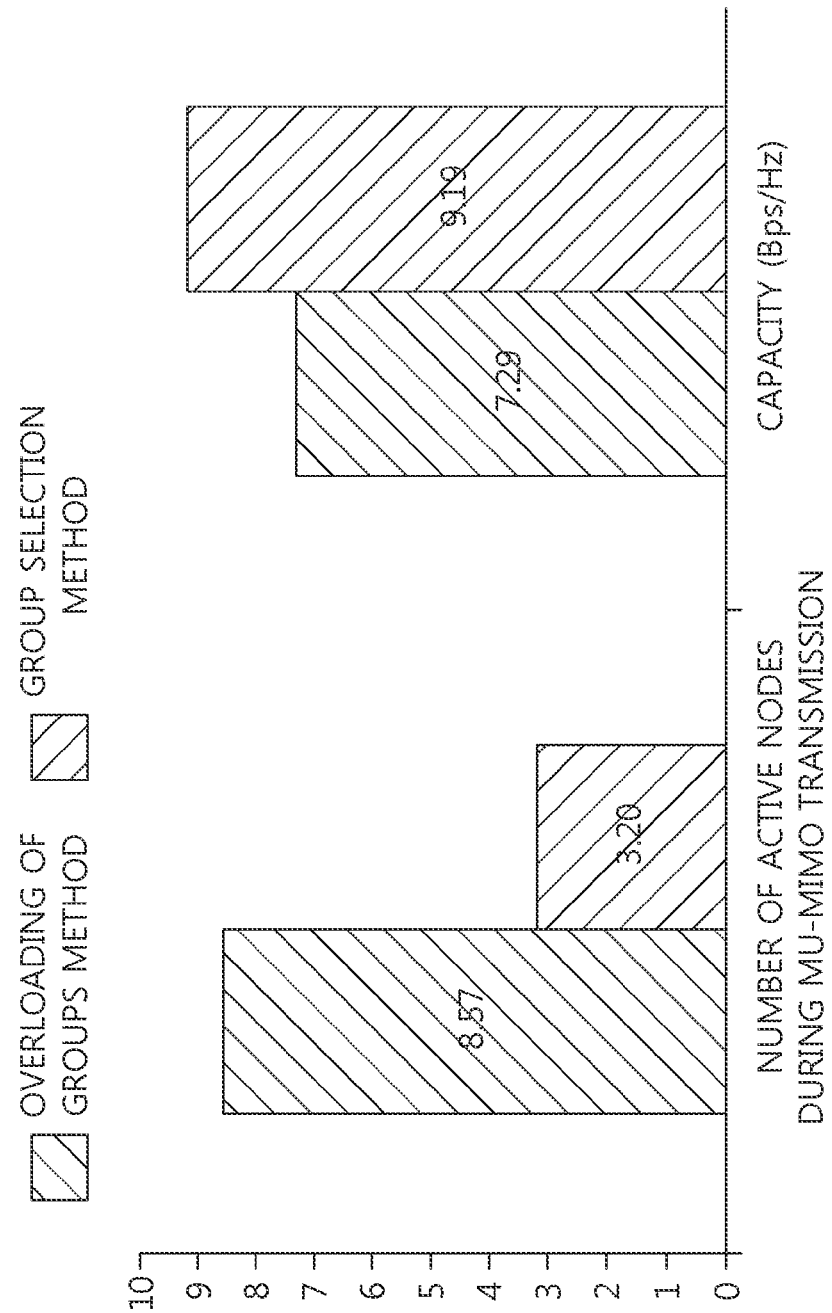
FIG. 12 shows a simulation result in which performance of a group overload method and performance of a group selection method are compared with each other.

FIG. 12 shows a simulation result in which performance of a group overload method and performance of a group selection method are compared with each other.

A simulation environment in which one AP has four transmission antennas, and 10 users have two transmission antennas is assumed. Referring to FIG. 12, in the group selection method, 3.2 users receive a data stream for a unit time on average, and in the group overload method, 8.57 users receives the data stream for a unit time on average. That is, in terms of efficiency, the group selection method is more effective. Further, since a user group set having relatively high transmission yield is selected, the group selection method may acquire higher performance even in terms of network performance.

Figure 13:
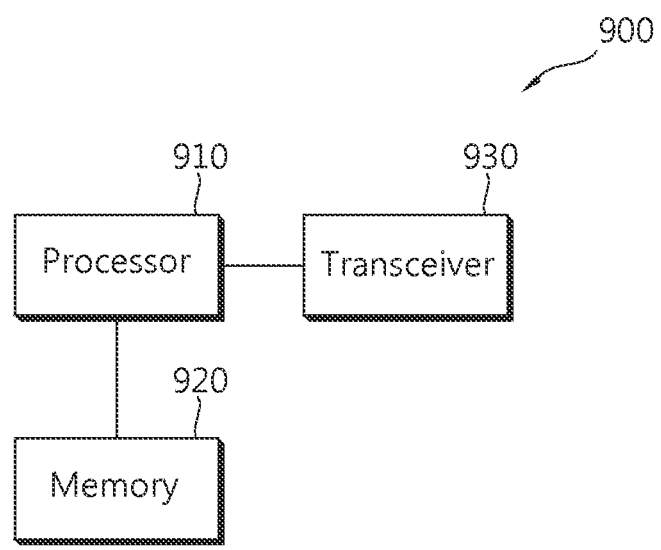
FIG. 13 is a block diagram of a wireless device to implement an embodiment of the present invention.

FIG. 13 is a block diagram of a wireless device to implement an embodiment of the present invention. The wireless device may be an AP or STA.

A wireless device 900 includes a processor 910, a memory 920, and a radio frequency (RF) unit 930. The processor 910 may be configured to implement proposed functions, procedures, and/or methods in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processor 910 may include application-specific integrated circuit (ASIC), other chipset, logic circuit and/or data processing device. The memory 920 may include read-only memory (ROM), random access memory (RAM), flash memory, memory card, storage medium and/or other storage device. The RF unit 930 may include baseband circuitry to process radio frequency signals. When the embodiments are implemented in software, the techniques described herein can be implemented with modules (e.g., procedures, functions, and so on) that perform the functions described herein. The modules can be stored in memory 920 and executed by the processor 910. The memory 920 can be implemented within the processor 910 or external to the processor 910 in which case those can be communicatively coupled to the processor 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for measuring, by a station (STA), a channel in a wireless LAN system, the method comprising:
   receiving a plurality of sounding frames from an access point (AP) when the STA is a long-term channel measurable STA;
   determining a first long-term channel state information (LCSI) based on the plurality of sounding frames when the STA is the long-term channel measurable STA;
   transmitting the first LCSI to the AP when the STA is the long-term channel measurable STA;
   receiving a first group identifier (ID) management frame including information on a first group ID determined based on the first LCSI from the AP when the STA is the long-term channel measurable STA;
   receiving a beamforming feedback request frame periodically from the AP when the STA is a long-term channel non-measurable STA;
   transmitting a beamforming feedback frame to the AP periodically in response to the beamforming feedback request frame when the STA is the long-term channel non-measurable STA; and
   receiving a second group identifier (ID) management frame including information on a second group ID determined based on a second LCSI from the AP when the STA is the long-term channel non-measurable STA,
   wherein the plurality of sounding frames includes sounding frames transmitted to the STA and overheard sounding frames transmitted to another STA,
   wherein the first LCSI is transmitted through an LCSI report field within a very high throughput (VHT) action frame, and
   wherein the second LCSI determined by the AP based on the beamforming feedback frame.

2. The method of claim 1, wherein each of the first LCSI and the second LSCI is calculated by Equation of $E_T[H_k{}^*H_k]$, where $E_T$ represents an average for a time T, $H_k$ represents a channel matrix of a k-th user, and $H_k{}^*$ represents a conjugate transpose matrix of $H_k$.

3. A method for managing, by an access point (AP), group identifier (ID) in a wireless LAN system, the method comprising:
   determining whether or not a station (STA) is a long-term channel measurable STA;
   transmitting a plurality of sounding frames to the STA when the STA is the long-term channel measurable STA;
   receiving a first long-term channel state information (LCSI) from the STA generated based on the plurality of sounding frames when the STA is the long-term channel measurable STA;
   calculating a bound of a first time-averaged multi user (MU) multiple-input multiple-output (MIMO) sum capacity based on the first LCSI when the STA is the long-term channel measurable STA; and
   transmitting a first group ID management frame including information on a first group ID determined based on the calculated bound of the first time-averaged MU-MIMO sum capacity to the STA when the STA is the long-term channel measurable STA,
   transmitting a beamforming feedback request frame to the STA periodically when the STA is a long-term channel non-measurable STA;
   receiving a beamforming feedback frame from the STA periodically in response to the beamforming feedback request frame when the STA is the long-term channel non-measurable STA;
   generating a second LCSI based on beamforming feedback frame when the STA is the long-term channel non-measurable STA;
   calculating a bound of a time-averaged MU MIMO sum capacity based on the second LCSI when the STA is the long-term channel non-measurable STA; and
   transmitting a second group ID management frame including information on a second group ID determined based on the calculated bound of the second time-averaged MU-MIMO sum capacity to the STA when the STA is the long-term channel non-measurable STA,
   wherein the plurality of sounding frames includes sounding frames transmitted to the STA and overheard sounding frames transmitted to another station, and
   wherein the first LCSI is transmitted through an LCSI report field within a very high throughput (VHT) action frame.

4. The method of claim 3, wherein each of the first LCSI and the second LSCI is calculated by Equation of $E_T[H_k{}^*H_k]$, where $E_T$ represents an average for a time T, $H_k$ represents a channel matrix of a k-th user, and $H_k{}^*$ represents a conjugate transpose matrix of $H_k$.

5. The method of claim 4, wherein each of the bound of the first time-averaged MU-MIMO sum capacity and the bound of the second time-averaged MU-MIMO sum capacity is calculated by the following Equation, $$\bar{C}_{MU-MIMO_{SUM}} \leq C_{MU-MIMO_{bound}} = \log_2 \det\left(I + \frac{SNR}{N_t}\sum_{k=1}^{K} E_T[H_k^* H_k]\right),$$

where I represents an interference matrix, SNR represents a signal to noise ratio, and K represents the number of users.

* * * * *